United States Patent

Kochanski

[11] Patent Number: 5,854,661
[45] Date of Patent: Dec. 29, 1998

[54] SYSTEM AND METHOD FOR SUBTRACTING REFLECTION IMAGES FROM A DISPLAY SCREEN

[75] Inventor: Gregory Peter Kochanski, Dunellen, N.J.

[73] Assignee: Lucent Technologies Inc., Murray Hill, N.J.

[21] Appl. No.: 940,221

[22] Filed: Sep. 30, 1997

[51] Int. Cl.⁶ .................................................... H04N 5/57
[52] U.S. Cl. ........................... 348/602; 348/687; 345/102
[58] Field of Search .................. 348/602, 687, 348/688, 805, 239, 834, 607; 345/102, 207, 214, 147

[56] References Cited

U.S. PATENT DOCUMENTS

| 4,997,203 | 3/1991 | Cohen et al. | 345/102 |
| 5,057,744 | 10/1991 | Barbier et al. | 348/602 |
| 5,585,841 | 12/1996 | Hardin | 348/602 |
| 5,617,112 | 4/1997 | Yoshida et al. | 345/102 |

*Primary Examiner*—Victor R. Kostak

[57] ABSTRACT

A system and method for subtracting reflection images, caused by proximately located light sources, from an image displayed on a video display screen. The present invention includes a camera mounted in close proximity to a video display device having a display screen, and oriented to point towards a user. The camera is connected to a control unit capable of image processing and of adjusting the images displayed on the display screen. Light from the proximately located light source falls upon the display screen causing glare from the light source and forming reflection images of the user and other objects on the display screen. In order to eliminate these undesirable reflection images from the display screen, the control unit first locates the reflection images on the display screen, and then eliminates these images by adjusting the brightness values of the reflection images' pixels.

8 Claims, 5 Drawing Sheets

SYSTEM AND METHOD FOR SUBTRACTING REFLECTION IMAGES FROM A DISPLAY SCREEN

BACKGROUND OF THE INVENTION

1. Field of the Invention

The present invention relates to eliminating undesirable reflection images from a video display screen. More particularly, the present invention is directed to a system and method for subtracting reflection images, caused by proximately located light sources, from an image displayed on the video display screen.

2. Description of the Related Art

Devices incorporating video display screens, such as televisions and computer monitors have been in use for several decades. Over the years video display devices have greatly improved the quality of displayed images and acquired a number of advanced features. However, one pervasive problem shared by all video display devices is the presence of glare and reflection images on a video display screen resulting from sunlight or light sources located in the area of the video display device. Glare and reflections severely affect the quality of displayed images and significantly contribute to user eyestrain. Two solutions have been developed to address this problem—screen coating and polarizing panels. A screen coating is typically a multi-layer coating of material with a graded refractive index. While a screen coating reduces glare due to the interface between the air and the glass, it does not reduce reflections due to phosphor particles present in conventional display screens. Furthermore, a typical screen coating is delicate and hard to clean. Finally, anyone touching a coated screen will leave difficult to remove fingerprints.

Other techniques involve introducing absorptive layers either onto the glass, or as aftermarket accessories, placed between the screen and the user. These are useful because light reflected from the screen passes through the absorbing layer twice, while the desirable light from the screen is only absorbed once. Consequently, reflections are attenuated more than the image, and become less noticeable as more attenuation is added. Unfortunately existing display devices cannot produce enough light to wholly compensate for the loss of light as it passes from the screen through the absorptive layer. This deficiency results from a combination of limitations involving battery life, phosphor life, and the physics of electron guns.

Both approaches (i.e., the screen coating and an absorptive layer) can be used in combination, but it has proven impossible to lower the screen reflectivity substantially below 1%. At this level, reflections from light sources and windows are disturbing, and reflections of other objects are visible, especially on darker parts of the screen.

It would thus be desirable to provide a system and method for reducing or eliminating undesirable reflection images, caused by proximal light sources, from a video display screen without affecting the quality of a display image.

SUMMARY OF THE INVENTION

The disadvantages and limitations discussed above are overcome by the present invention. The present invention includes a camera mounted in close proximity to a video display device having a display screen and oriented to point towards a user. The camera is connected to a control unit capable of image processing and of adjusting the images displayed on the display screen.

In a typical user environment in which the video display device is used, at least one light source is mounted on ceiling above and in proximity to the user of the video display device. Light from the light source falls upon the display screen causing glare from the light source and forming reflection images of the user and other objects on the display screen. In order to eliminate these undesirable reflection images from the display screen, the control unit first locates the reflection images on the display screen, and then eliminates these images by adjusting the brightness values of the reflection images' pixels.

The control unit acquires, through the camera, a raw image of the camera field of view. The control unit then derives the angular positions and angular sizes of all relevant objects capable of causing reflection images that are present in the raw image. For example, the angular sizes and positions of the light source, the user's head or eyes, and of the objects behind the user may be derived. The control unit then determines the distances from the display screen to the relevant objects by one or more distance determination techniques and arrives at a set of most probable distance estimates for all relevant objects. Using the angular sizes and positions of the objects causing reflections and the distances from those objects to the display screen, the main control unit then generates a map that associates pixels on the display screen with positions of light sources and objects in the camera's field of view whose reflection appears on the associated pixels. Finally, the control unit adjusts the brightness of each identified reflection pixel to remove the pixel's reflected image component using data acquired by the camera.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Although the present invention is described with reference to a specific embodiment of a camera-based system for subtracting reflection images from a computer display screen, it should be understood that the system of the present invention may be implemented with a variety of display screens such as televisions, and industrial imaging and display readout monitors. All such variations are intended to be included within the scope of the present invention.

Figure 1:
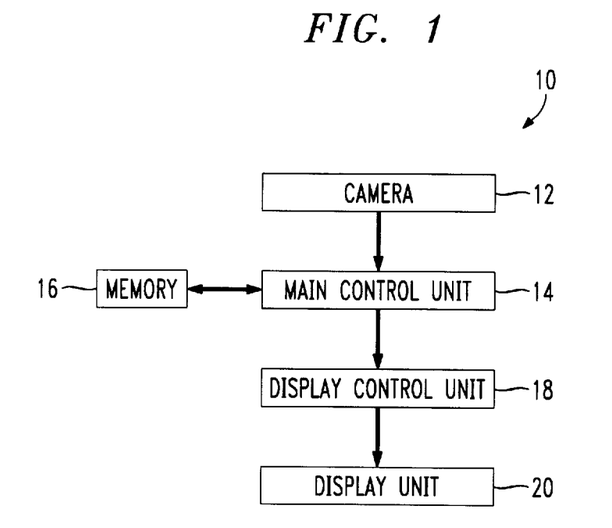
FIG. 1 is a block diagram of a system for subtracting reflection images from a display screen in accordance with the present invention.

Referring initially to FIG. 1, a reflection image subtraction system 10 for subtracting reflection images from a display screen is shown. The image subtraction system 10 includes a camera 12 which may be any small color camera such as a CCD camera. The camera 12 is connected to a main control unit 14 having image analysis and image processing circuitry and a microprocessor for executing a control program described in greater detail below in connection with FIG. 3–7. The main control unit 14 is connected to a memory 16 for storing control program variables and system settings. The main control unit 14 and memory 16 may be implemented in a separate housing from the camera 12 and connected to the camera 12 by a suitable cable (not shown). Alternatively, the main control unit 14 and memory 16 may be implemented in the same housing as the camera 12.

The main control unit 14 is connected to a display control unit 18, which based on signals received from the main control unit 14, subtracts reflection images from a display screen 20 connected thereto. The connection between the main control unit 14 and the display control unit 18 may be accomplished by a suitable cable, via a wireless link, or via a computer's internal data bus. The display screen 20 may be a standard CRT monitor or a active or passive matrix flat panel display or equivalent comprising a plurality of illuminated pixels or pixel elements. The display control unit 18 preferably includes image control circuitry (not shown) for controlling the brightness and color of individual pixels or pixel elements of the display screen 20. Both the display control unit 18 and the display screen 20 may be incorporated into a display monitor housing (shown as 22 in FIG. 2) as a matter of design choice.

Figure 2:
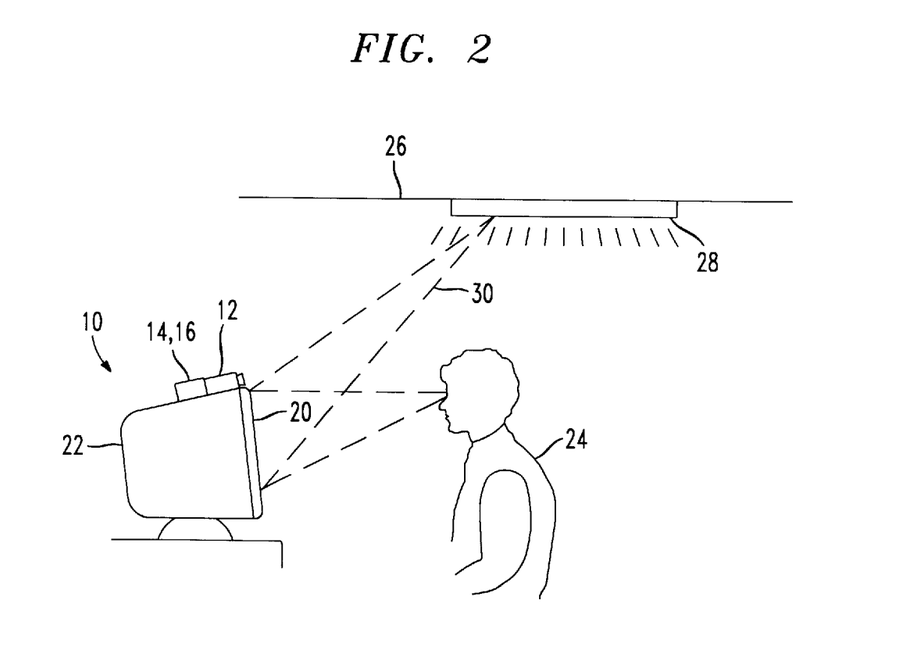
FIG. 2 is a schematic diagram showing an exemplary implementation of the system of FIG. 1.

Referring to FIG. 2, a schematic diagram of an exemplary implementation embodiment of the image subtraction system 10 is shown. In this embodiment, the camera 12 and the main control unit/memory 14,16 are shown as mounted on top of the display monitor 22 by way of example. The camera 12 and the main control unit/memory 14,16 may be mounted on any side of the display monitor 22 as long as the camera 12 is oriented toward a user 24. In an alternate embodiment, the camera 12 and the main control unit/memory 14,16 may be incorporated into the display monitor 22 housing.

In summary, the image subtraction system of the present invention operates as follows. In a typical user environment, at least one light source 28 is mounted on ceiling 26 above and in proximity to the user 24. Light 30 from the light source 28 falls upon the display screen 20 causing glare in form of a reflection image of the light source 28 seen by the user 24. Furthermore, other objects behind the user 24, such as furniture (not shown) may appear on the display screen 20 as one or more additional reflection images caused by the light source 28. Finally, the user 24 may see his own reflection image in the display screen 20. These reflection images greatly reduce the image quality of any display monitor and seriously impair the user's tasks performed on a device (such as a personal computer) attached to the display monitor 22. In order to eliminate these undesirable reflection images from the display screen 20, the main control unit 14 first associates pixels on the display screen 20 with locations in the camera 12 field of view, and then obtains estimates for the brightness of the reflection that appears on each associated pixel. It then eliminates reflection images by adjusting the brightness value of each pixel on which a portion of the reflection images appears.

The main control unit 14 acquires, through the camera 12, a raw image of the camera 12 field of view. The main control unit 14 stores a copy of the raw image, and then derives the angular positions and angular sizes of all relevant objects capable of causing reflection images present therein. For example, the angular sizes and positions of the light source, the user's head or eyes, and of the objects near and behind the user may be derived. The main control unit 14 then determines the distances from the display screen 20 to the relevant objects by one or more distance determination techniques described below in connection with FIGS. 5 and 6 and arrives at a set of most probable distance estimates for all relevant objects. Using the angular sizes and positions of the objects causing reflections and the distances from those objects to the display screen 20, the main control unit 14 then constructs a function that yields an estimate of the distance to objects given a pair of coordinates, such as the previously derived angular positions of light sources, objects, and the user's features. The main control unit 14 then calculates a mapping function. This function relates a first set of pixel locations on the display screen 20 with a second set of pixel locations in the camera 12 field of view that are estimated by the main control unit 14 to be seen by the user as reflection images at the first set of pixel locations. Finally, the main control unit 14 causes the display control unit 18 to adjust the brightness of one or more of the display 20 pixels at the first set of pixel locations to remove the pixels reflected image component from at least a portion of the pixels. It should be understood that one skilled in the art that the above steps may be performed in accordance with a variety of mathematical techniques that vary from the ones described herein without departing from the spirit of the present invention.

Figure 3:
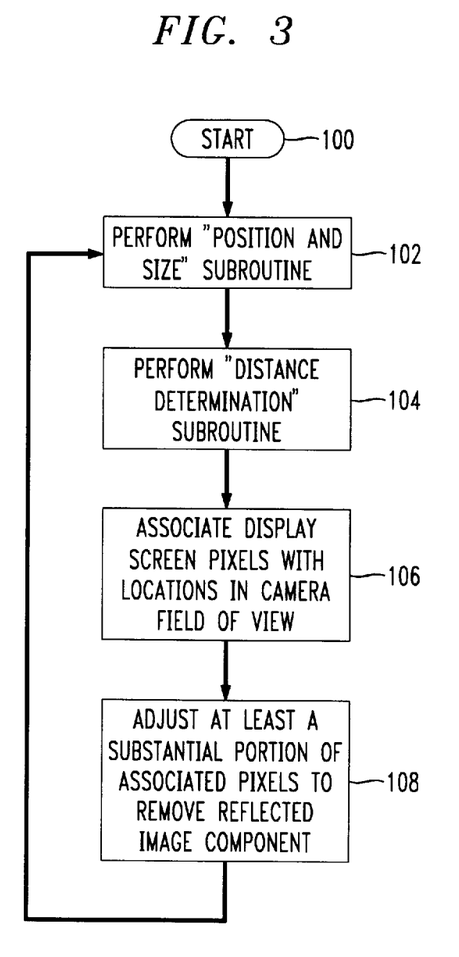
FIGS. 3–5 show logic diagrams representative of the operation of a control program executed by the system of FIG. 1.

Referring now to FIG. 3, a logic flow diagram representing a control program for the main control unit 14 of FIG. 1 in accordance with a preferred embodiment of the present invention is shown. The control program typically begins at step 100 when the reflection image subtraction system 10 is activated and operates continually until the system 10 is deactivated. At step 102, the main control unit 14 performs a "Position and Size" (hereinafter "P/S") subroutine. Subroutines are known in the computer programming art as functions designed to perform specific tasks requested by a main control program.

Figure 4:
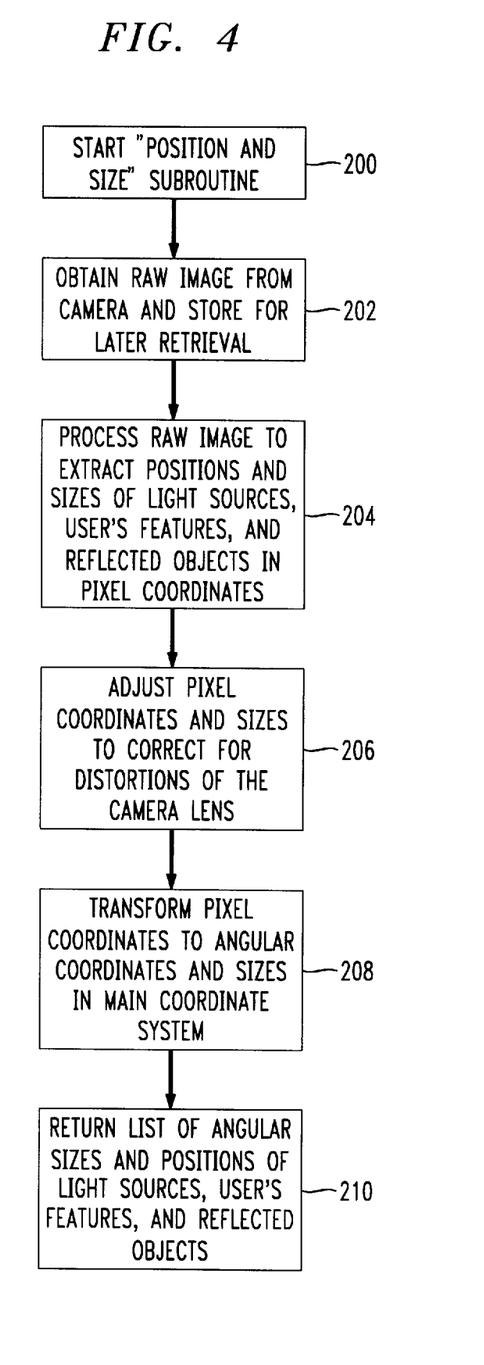

Referring now to FIG. 4, the P/S subroutine is executed by the main control unit 14 to determine angular sizes and positions of all objects within the camera 12 field of view that are capable of causing reflection images on the display screen 20. The P/S subroutine begins at step 200 and at step 202, the main control unit 14 obtains a raw image from the camera 12 representative of its entire field of view and stores a copy of the raw image for later use at the memory 16. At step 204, the main control unit 14 extracts the position and pixel size of at least one object within the camera 12 field of view in pixel coordinates. This may be done by one or more image recognition techniques known in the art. For example, light sources may be identified by their relative brightness, while the user or specific parts of the user's body, such as the face or the eyes may be identified by techniques described in "Tracking Human Faces in Real-Time" (Jie Yand et al., Carnegie Mellon University Journal, 1995) or in "3-D Model-based Tracking of Humans in Action: a Multi-view Approach" (D. M. Gavrila et al., CfAR Journal, 1995). Likewise, the sizes of objects in pixels are relatively easy to measure. A variety of heuristic techniques may be applied to select suitable objects. For example, it is preferable to first select brighter objects (such as light sources) in order to improve the overall performance of the system of present invention. Other heuristic approaches, such as ones that take into account the performance of the human visual system may also be applied.

At step 206 the main control unit 14 adjusts the pixel coordinates and sizes obtained at step 204 to correct for distortions of the camera 12 lens as it is well known in the art that raw images obtained by cameras suffer from geometric distortion. At step 208, the main control unit 14 transforms the corrected pixel coordinates and sizes into angular coordinates in a main coordinate system of the display screen 20. This operation results in a list of angular sizes of each reflected object and two dimensional directional vectors for each object representative of its position with respect to the main coordinate system of the display screen 20.

At step 210, the main control unit 14 returns the list of angular sizes of each reflected object and two dimensional directional vectors for each object to the main control program and ends the P/S subroutine.

Returning now to FIG. 3, at step 104 the main control unit 14 performs a "Distance Determination" (hereinafter "DD") subroutine to determine distances to the objects whose positions and sizes were previously determined by the P/S subroutine.

Figure 5:
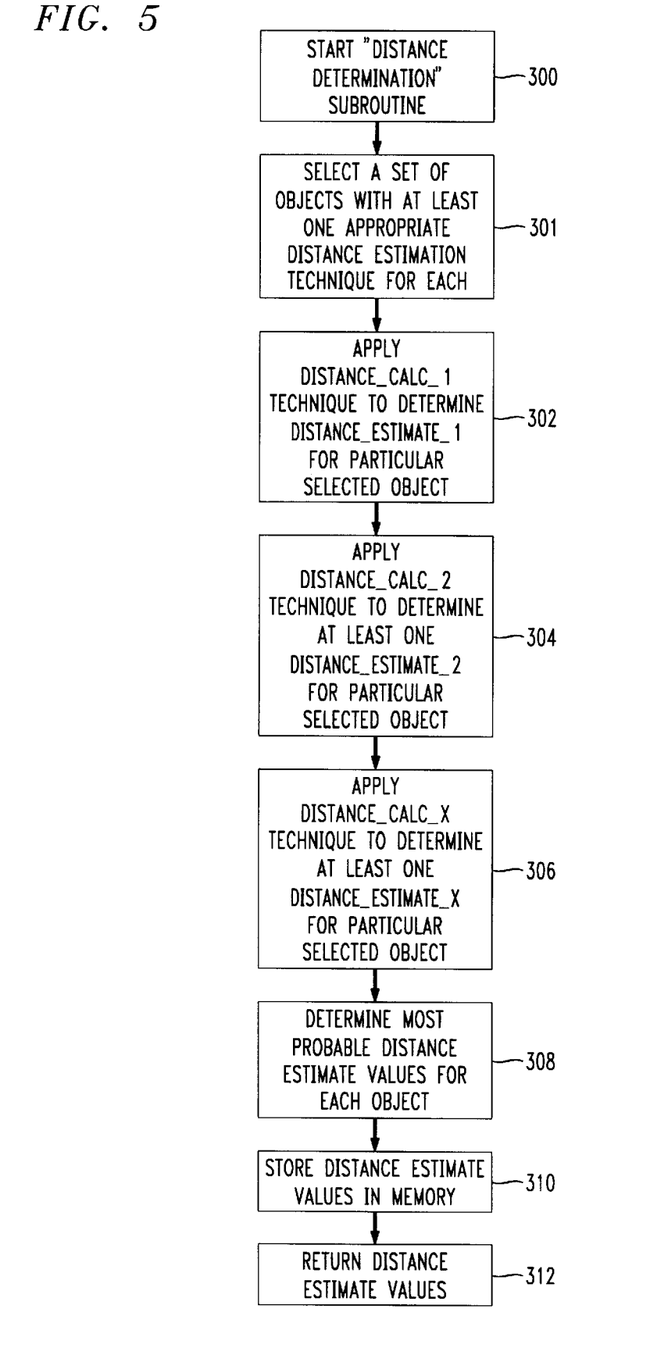

Referring now to FIG. 5, the DD subroutine begins at step 300 and proceeds to step 301 where the main control unit 14 selects a at least a portion of the objects for which angular sizes were returned at step 210 and for which distance estimation is appropriate. Different distance estimate approaches are better for determining distances to certain objects. For example, the best distance estimate approach to determining distance to the ceiling would not work very well for determining the distance to the users eyes. Thus, at step 301, the main control unit 14 also selects particular distance estimate techniques to be used for different types of objects. For example, a first distance estimate technique (hereinafter "Distance_Calc_1") may be selected by the main control unit 14 to estimate the distance from the camera 12 to the ceiling 26, while another distance estimate technique is selected for measuring the distance from the camera 12 to the user 24. A list of various types of objects along with a preferred distance estimate technique for each may be stored at the memory 16 for retrieval by the main control unit 14.

At step 302, the main control unit 14 determines a first distance estimate (hereinafter "Distance_Estimate_1") appropriate for one or more reflected objects, for example, the user 24's eyes, using a first distance estimate technique. Each distance estimation technique typically returns, along with a distance estimate, an error bar σ or another indicator of the accuracy of the distance estimate. Preferably, the error bar σ for the distance estimation techniques used in conjunction with the present invention should be expressed as a standard deviation of a distance estimate.

Once skilled in the art can device many techniques for distance estimation without departing from the spirit of the present invention. The simplest approach is to empirically measure typical distances from users to their display screens, typical ceiling heights, light source distances and office furniture positions. This technique is useful because the configuration of workplace cubicles in most corporations is fairly uniform. In accordance with this empirical measurement approach, the main control unit 14 uses information from the camera 12 to classify detected objects (e.g., a ceiling light, a rear cubicle wall, etc.) and then compares the classified objects to a database of objects stored in the memory 16 to determine a typical distance and error bar σ for each object. The distance and error bar values database is preferably constructed by measuring, in many office environments, the distances from a computer screen to other objects typically present in offices such as ceiling lights and office furniture, and then calculating a median and standard deviation therefrom. A simplified version of this technique can be implemented without classifying objects, with the main control unit 14 returning the same predetermined distance and error bar estimates for all objects.

In a similar distance estimation approach, the user 24 may select and adjust distance estimates used by the main control unit 14 based on the user's own work environment via a user interface with the main control unit 14 (not shown). This approach provides good distance estimates because the user may provide enters specific distance data which may be difficult to detect automatically.

Another distance estimate technique useful for determining distance to the user involves obtaining, by the main control unit 14, the outline of the user's head from the camera 12. This may be done in accordance with one or more known methods described in publications cited above in connection with FIG. 4. The main control unit 14 then calculates an estimated distance to the user 24 as follows:

$$d_{user} = \frac{\text{typical frontal area of human heads}}{\text{(solid angle enclosed in outline)}}$$

another estimate could be:

$$d_{user} = \frac{\text{typical width of human heads}}{\text{(angular width of outline)}}$$

Likewise, if the user's eyes are identified by the camera 12, then the distance may be estimated as follows:

$$d_{user} = \frac{\text{typical distance between eyes}}{\text{(angular separation between eyes)}}$$

Similarly, other identifiable features of the user 24 can be used (e.g. shoulders, nose, chin, etc.). $C_1$, $C_2$, and $C_3$ are preferably predetermined constants selected to make the above distance estimates as accurate as possible.

Figure 6:
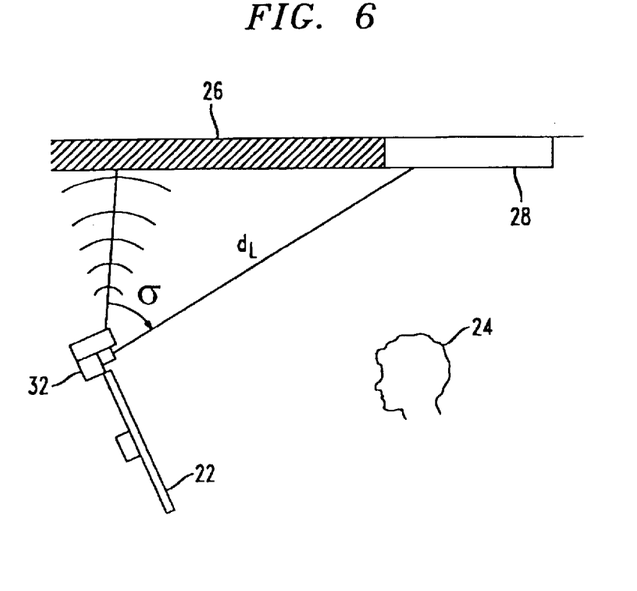
FIGS. 6 shows an exemplary embodiment of a distance measurement component of the system of FIG. 1.

Referring to FIG. 6, yet another distance estimation technique useful for measuring the distance to the user and to the light source utilizes an ultrasonic transducer 32 connected to the main control unit 14 to measure distances via sound-wave travel times, with a first acoustic beam predominantly normal to the display screen 20 and oriented towards the user 24. The transducer generates several echograms, showing reflected sound intensity vs. distance. The distance estimate to the user 24 may be determined by finding in the closest region of the echograms where the variance of equivalent distances on different echograms is large (i.e. above a factory-set threshold). and multiplying the found distance by a manufacturer-determined constant. A simpler version of this technique uses the distance to the first substantial echo within a suitable range (typically from 1.5 to 5 feet) as a distance estimate. The error bar σ may be determined by experiment in the manufacturer.

Similarly, the ultrasonic transducer 32 may be oriented in a approximately vertical direction. As before, an echogram is constructed by the main control unit 14. The distance to the ceiling 26 is that of the strongest echo (within a suitable range, typically 3–12 feet). Distance $d_L$ to the light source 28 is then calculated geometrically because the angular position of the light source 28, and thus the angle 2, is known from the P/S subroutine. The error bar σ may be estimated by empirical tests by the manufacturer. In a simpler version of the above technique, the main control unit 14 relies on a pre-set typical ceiling height value when estimating the distance to the light source 28.

Distances can also be estimated by measuring angular spacings between ceiling lights, or other identifiable architectural features, and comparing the measurements to pre-measured linear distance values for typical offices that are stored in the memory 16.

Yet another distance estimation technique that is especially advantageous for determining distances to objects near the display screen 20, involves measuring the amount of light from the display screen 20 that reflects off an object and enters the camera 12. This measurement is proportional to the distance from the display screen 20 to the object causing the reflection. Objects that are relatively distant from the display screen 20 are weakly illuminated by it, and thus only a small amount of light generated by the display screen 20 is reflected into the camera 12. Conversely objects that are proximate to the display screen 20 will reflect proportionally more light into the camera 20. It is then a relatively simple manner to measure the amount of reflected light, and thus to estimate the distance, for example, by correlating changes in the display screen 20 brightness with changes in light intensity data obtained from the camera 12. It may also be useful to intentionally vary the display screen 20 brightness to enhance the accuracy of this technique. It should be noted that one skilled in the art can readily adapt other distance measurement techniques that rely on screen brightness and reflectivity of an object to which the distance is being measured without departing from the spirit of the present invention.

Finally, the main control unit 14 can estimate distances by returning previously stored distance estimates. This technique increases the stability of the image subtraction system because it takes into account previously determined distances and will reduce flickering of the final image that may be caused by rapid changes in distance estimates.

Because none of the distance estimation techniques produce extremely accurate estimates it is advantageous to make several distance estimates for each object using different techniques and then mathematically determine most probable values for each set of estimates. While only two additional distance estimation steps 304 and 306 are shown in FIG. 5, it will be understood that a greater or a lesser number of distance estimate techniques may be applied to each object as a matter of design choice. After several sets of distance estimates have been obtained at steps 302 to 306, at step 308, the main control unit 14 determines the most probable distance estimate values to each selected object from the previously distance estimates. This operation may be performed by one or more of a variety of known statistical approaches for determining most probable values given estimates and predetermined error bars. For example, the Huber text (Peter J. Huber, "Robust Statistics", Wiley, 1981, ISBN 0-471-41805-6, p. 135–148) shows several techniques of "robust statistics" that could be adapted for most probable value determination. At step 310, the main control unit 14 stores the most probable distance estimate values in memory 16 for future retrieval. At step 312, the main control unit 14 returns the most probable distance estimate values for each object to the main control program. Optionally, error estimates corresponding to the most probable distance estimate values may also be stored.

Returning now to FIG. 3, at step 106, the main control unit 14 locates the reflection images by identifying and associating a group of pixels on the display screen 20 screen with the locations in the camera 12 field of view that appear reflected on the pixel group, and at step 108 the main control unit 14 adjusts the brightness of at least a substantial portion of the identified group of pixels to remove their reflected image components. The main control unit 14 then returns to step 102.

There are a number of approaches that may be used to first locate and then adjust display screen 20 pixels having reflection image components. In one exemplary approach to locating pixels with reflection images as seen by the user, the main control unit 14 generates a function that associates display screen 20 pixels on which a reflection image appears with an angular position in the camera 12 field of view. This process involves two basic steps. First, the distance estimates returned at step 312 are combined into a single function Q, that yields an estimate of the distance from the camera 12 to the nearest object, in any given direction. The main control unit 14 constructs the function Q using the positions and sizes of various objects obtained from the P/S subroutine and the distances to those objects obtained from the DD subroutine. Because Q is not a very exact function, a second function R that varies between 0 and 1 and that describes the accuracy of Q at any given position may also be constructed.

Second, using Q, the known location of the user's eyes (from the P/S and the DD subroutines), the geometry of the camera 12 and display screen 20, and the conventional laws of optics, it is a relatively simple matter for the main control unit 14 to calculate the direction (as seen from the camera 12) at which the object that is reflected upon a given display screen 20 pixel appears.

Because only certain potential reflective objects are identified by the main control unit 14, the function Q enables the main control unit 14 to calculate reflections for objects whose distances could not be directly determined and to smooth out any errors in determining object positions by smoothly interpolating between all known measurements.

The distance function, Q, may be implemented as a two-dimensional array of distance estimates, for each angle in a regular array of angles, also utilizing an interpolation rule for calculating Q at angles intermediate between the tabulated values. A preferred representation of Q involves a set of stored distance estimates, returned by the DD subroutine, stored at angles defined by the camera 12, rather than on a regular array. In either case, Q would typically have a substantially constant value, given by the distance to an object, for those angles where a vector W points at the object. The vector W being representative of a vector from the camera 12 to a particular object causing a reflection on the display screen 20. In such regions, the accuracy function, R, would have values near 1 (typically greater than 0.5). Values of R may depend on the error bars of the distance estimates for the object, typically becoming closer to 1 as the error bars become smaller. A typical R may be expressed as R=max(0, 1—(typical_fractional_error_inQ)), where the typical_fractional_error is determined by experimentation.

In regions where no objects are detected by the camera 12, Q is typically a continuous function, with a value intermediate between the distances of the several neighboring objects. In such regions, R is typically smaller than 0.5, approaching zero at regions that are more distant from the nearest identified object. R is typically continuous everywhere.

Under certain circumstances, it may be advantageous to modify the above-described properties of Q. For instance, it is advantageous for Q to be discontinuous at the edge of the user's head, as the image of the user's head will typically be superimposed upon the image of more distant objects, such as the far wall of the office. In this case, Q could be constructed as a continuous function, using all objects but the user's head, then the part of those functions under the image of the user's head would be replaced by the measured values. In such a case, R would remain continuous, but would approach zero near the edge of the user's head.

Likewise, if enough is known about certain objects, it may be advantageous for Q not to be substantially constant across such certain objects. For instance, human faces have roughly similar shape, and the ears are a substantially constant distance further away from the screen than the nose. Such differences could be advantageously incorporated into the construction of Q. As another example, if it could be established that a given light source is, for example, flush with the ceiling, the distance to various parts of the light source could be derived from geometrical calculations, and it would be advantageous for Q to incorporate such information.

Figure 7:
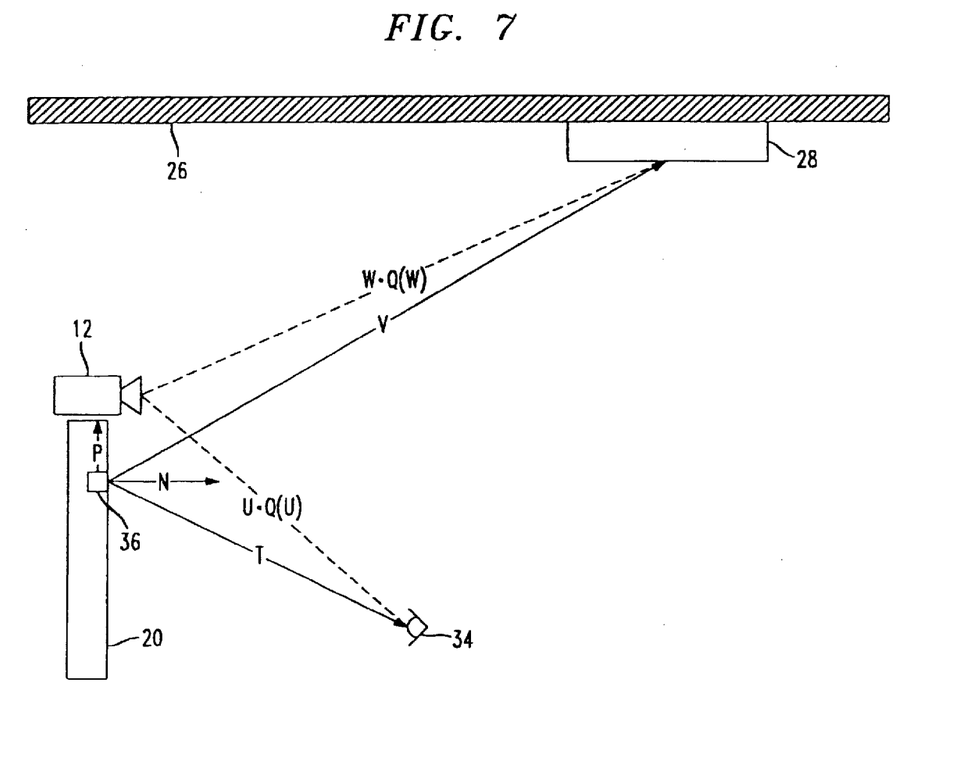
FIG. 7 shows a schematic diagram of an operation of one embodiment of a reflection image subtraction function of the system of FIG. 1.

Referring now to FIG. 7, a diagram of the geometry involved in associating display screen 20 pixels on which a reflection image appears with angular positions in the camera 12 field of view in one embodiment of the present invention is shown. While only a single object causing reflection 28 is shown for the sake of clarity, it should be understood that similar geometrical principles can be readily applied to a plurality of objects.

Vectors U and W are unit vectors from the camera 12 to the user's eye 34, and the camera 12 to object 28, respectively. Vector N is the unit normal to the screen at the pixel under consideration (for a curved screen, such as a typical CRT screen, N is slightly different at each pixel, but is known at the time of manufacture). Vector T is a vector from a pixel 36 to the user's eye 34. Vector V is a vector from the pixel 36 to the object 28. The laws of optics define the relationship between vectors N, T, and V. Specifically, N, T, and V are in the same plane, and the angle between T and N is equal to the angle between N and V, i.e., the angle of incidence equals the angle of reflection. Then, given a known vector P between the pixel 36 and the camera 12, the unknown vectors W and V may be calculated by standard numerical techniques. In general, the equations are not amenable to analytic solution, because the distance function, Q, is a complicated function of the vector W.

Typically, one would express the vectors in terms of directional cosines, derive a set of simultaneous equations, and solve the equations by one of the standard techniques for multidimensional optimization. Such techniques have been described in detail in at least the following publications: *Introduction to Numerical Analysis*, by J. Stoer and R. Bulirsch, ISBN 0-387-90420-4, Springer Verlag 1980, p266–270, 300–309; and Numerical Recipes in C, W.H. Press, S. A. Teukolsky, W. T. Vetterling, and B. P. Flannery, ISBN 0-521-43108-5, Cambridge University Press, 1992, pp. 383–393. In another technique, approximations that will be suitable for the expected range of distances between the screen and the user may be pre-calculated, thus reducing the complexity of the equations. Finally, if the display screen 20 is uniformly flat, as is typically true for liquid-crystal displays, the equations become somewhat simpler.

Because vectors V and W are representative of a reflection component of any display screen 20 pixel, preferably, V and W are determined for each pixel (i, j) on the display screen 20.

Now that the reflection image component for each pixel (i, j) is known, display data may be adjusted at each pixel (i, j) to compensate for its reflected image component in accordance with the following expression:

$$I'_{ij} = I_{ij} - (S(W) \cdot R(W) + S_{typ} \cdot (1 - R(W))) \cdot r(V - N)$$

In the above equation, $I'_{ij}$ is the desired actual brightness of a pixel (i, j), after correction for reflection images, $I_{ij}$ is the desired apparent brightness of the pixel (as viewed by the user). S(W) is the brightness of the room, as viewed by the camera 12, in direction W, and $S_{typ}$ is a typical (average or median) value of S(W). R(W) is the earlier defined accuracy function, and r(V–N) is the reflectivity of the display screen 20 at the angle of the reflection, where V is the direction from the pixel (i,j) to the object, and N is the direction of the display screen 20 normal.

The desired actual brightness, I', may not be physically realizable, because it may sometimes become negative, where bright reflections are superposed on faint regions of the screen. Thus, the main control unit 14 preferably calculates a final image, $I''_{ij}$, that is actually sent to the display screen 20 by the display control unit 18. The conversion of I' into I" to take into account negative brightness can be performed with a variety of known techniques. The simplest suitable procedure involves merely setting $I''_{ij} = \max(I'_{ij}, 0)$, thus truncating all negative values.

A better procedure, especially for color screens, involves representing luminance as accurately as possible for pixels with at least one negative color component (i.e., red, blue, or green), at the expense of the color. This may be done by calculating the luminance in accordance with the following expression:

$$L_{ij} = c_r \cdot I'_{ij,r} + c_b \cdot I'_{ij,b} + c_g \cdot I'_{ij,g},$$

where the r, g, b subscripts correspond to the red, green, and blue components of the color of the pixel (i, j), and $c_r$, $c_b$, and $c_g$ indicates the perceived luminance per intensity in each of the colors. If $L_{ij}$ is nonpositive, then $I''_{ij,\mu}$ is set to zero ($\mu$ being any of the red, green, or blue colors). Alternatively, if is positive, then $I''_{ij,\mu}$ may be calculated in accordance with the following expression:

$$I''_{ij,\mu} = L_{ij} \cdot h_\mu / (c_r \cdot h_r + c_g \cdot h_g + c_b \cdot h_b),$$

where h is an arbitrary color with all its components being positive. As a matter of design choice, h may be a constant for the entire display screen 20, determined by an average screen color. However, h is preferably adjusted on a per-pixel basis in order to obtain a more refined image.

A more preferable procedure, but one that is more computationally intensive, is to calculate $\beta_{ij} = -\min((I'_{ij}, 0))$, for all colors, smooth B by convolving it with a suitable kernel, k, (typically a Gaussian with a 5–50 pixel half-width, or computationally less expensive approximation thereof), and calculate $I''_{ij} = \max((I'_{ij} + (\beta_{ij} X k), 0))$. This approach addresses deficiency in the adjusted image on the display screen 20 by adding a smoothly varying (and therefore less obvious to the human eye) background to the image.

It will be understood that other techniques for adjusting image brightness may be used by one skilled in the art to subtract the reflection image components from pixels (i, j). The two techniques described above may advantageously be combined by the execution of one after the other.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A system for use in conjunction with a video display device, the video display device having image control means connected to a display screen for displaying an image of a predetermined first brightness value, for subtracting, from the displayed image, at least one reflection image of a second brightness value caused by light generated by at least one light source, the at least one reflection image being visible to a user of the video display device from a viewing position, the system comprising:

image acquisition means, positioned in proximity to the video display device at a predetermined distance and at predetermined coordinates with respect to the display screen and oriented to point substantially perpendicularly to the display screen and toward the user, operable for determining a position of at least one bodily feature of the user and positions of the at least one light source relative to said image acquisition means; and control means, connected to said image acquisition means and to the image control means, operable for:

determining the position and area of the at least one reflection image, caused by said at least one light source, on the display screen as seen from the user's viewing position, from said predetermined distance and coordinates of said image acquisition means and said positions of at least one bodily feature of the user and of the at least one light source;

determining, in conjunction with said image acquisition means, the second brightness value of the at least one reflection image;

determining a difference between the predetermined first brightness value of the display image and the second brightness value of the at least one reflected image; and causing the image control means to lower the first brightness value in said area of the at least one reflection image by a function of said difference, thereby eliminating at least a portion of said at least one reflection image from the display screen.

2. The system of claim 1, wherein said at least one bodily feature comprises the user's eyes.

3. The system of claim 1 wherein said image acquisition means further comprises a plurality of different distance determination means operable for determining a first plurality of estimated distances between said image acquisition means and at least one feature of the user's face, and determining a second plurality of estimated distances between said image acquisition system and each light source of the at least one light source, wherein said control means is further operable for:

determining a first best distance estimate from said first plurality of distances;

determining at least one second best distance estimate from said second plurality of distances for each of said at least one light source; and determining coordinates and area of the at least one reflection image, caused by said at least one light source, on the display screen and as viewed from the user's viewing position, from said predetermined distance and coordinates of said image acquisition means and said first and said at least one second best distance estimates.

4. The system of claim 1 wherein the at least one light source is an overhead light source and wherein said position of the user comprises a predetermined estimated distance between the user's eyes and the image acquisition means and a first directional vector from the image acquisition means to the user's eyes, and said position of the at least one light source comprises a predetermined estimated distance between the overhead light source and the image acquisition means and a second directional vector from the image acquisition means to the overhead light source.

5. The system of claim 1 wherein said image acquisition means further comprises first distance determination means operable for determining a first distance between said image acquisition means and at least one feature of the user's face, and determining a second distance between said image acquisition system and each light source of the at least one light source, wherein said control means is further operable for determining coordinates and area of the at least one reflection image, caused by said at least one light source, on the display screen and as viewed from the user's viewing position, from said predetermined distance and coordinates of said image acquisition means and said first and second distances.

6. The system of claim 1, wherein said image acquisition means is further operable for determining a position of at least one additional object relative to said image acquisition means, and wherein said control means is further operable for determining the position and area of the at least one reflection image, caused by said at least one light source, on the display screen as seen from the user's viewing position, from said predetermined distance and coordinates of said image acquisition means and said positions of at least one bodily feature of the user, of the at least one light source, and of the at least one additional object.

7. The system of claim 6, wherein said image acquisition means further comprises a plurality of different distance determination means operable for determining a first plurality of estimated distances between said image acquisition means and at least one feature of the user's face, and determining a second plurality of estimated distances between said image acquisition system and each light source of the at least one light source of a predetermined light source type, and between said image acquisition system and each additional object of the at least one additional object of a predetermined object type, and wherein said control means is further operable for:

determining a first best distance estimate from said first plurality of distances;

selecting at least one particular distance determination technique from a plurality of distance determination techniques for each light source and each object at least in accordance with said predetermined light source and predetermined object type;

determining at least one second best distance estimate from said second plurality of distances for each of said at least one light source and at least one additional object; and determining coordinates and area of the at least one reflection image, caused by said at least one light source and at least one additional object, on the display screen and as viewed from the user's viewing position, from said predetermined distance and coordinates of said image acquisition means and said first and said at least one second best distance estimates.

8. A method, implemented in conjunction with a video display device having image control means connected to a display screen for displaying an image of a predetermined first brightness value, for subtracting, from the displayed image, at least one reflection image of a second brightness value caused by light generated by at least one light source, the at least one reflection image being visible to a user of the video display device from a viewing position, the method comprising the steps of:

determining a position of at least one bodily feature of the user and positions of the at least one light source relative to said image acquisition means;

determining the position and area of the at least one reflection image, caused by said at least one light source, on the display screen as seen from the user's viewing position, from said predetermined distance and coordinates of said image acquisition means and said positions of at least one bodily feature of the user and of the at least one light source;

determining the second brightness value of the at least one reflection image;

determining a difference between the predetermined first brightness value of the display image and the second brightness value of the at least one reflected image; and     causing the image control means to lower the first brightness value in said area of the at least one reflection image by a function of said difference, thereby eliminating at least a portion of said at least one reflection image from the display screen.

* * * * *